US007062762B2

(12) United States Patent
Krishnamurthy et al.

(10) Patent No.: US 7,062,762 B2
(45) Date of Patent: Jun. 13, 2006

(54) PARTITIONING SYMMETRIC NODES EFFICIENTLY IN A SPLIT REGISTER FILE ARCHITECTURE

(75) Inventors: Gayathri Krishnamurthy, Sugarland, TX (US); Elana D. Granston, Sugarland, TX (US); Eric J. Stotzer, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 769 days.

(21) Appl. No.: 10/317,475

(22) Filed: Dec. 12, 2002

(65) Prior Publication Data

US 2003/0135724 A1    Jul. 17, 2003

Related U.S. Application Data

(60) Provisional application No. 60/341,557, filed on Dec. 12, 2001.

(51) Int. Cl.
G06F 9/45 (2006.01)
G06F 9/44 (2006.01)
G06F 15/00 (2006.01)

(52) U.S. Cl. ............... 717/156; 717/106; 717/155; 717/157; 712/201; 712/245

(58) Field of Classification Search ............. 717/106, 717/132, 133, 144, 155–156, 157, 161; 712/201, 712/245
See application file for complete search history.

(56) References Cited

U.S. PATENT DOCUMENTS 5,127,104 A * 6/1992 Dennis ................ 712/201
5,442,563 A * 8/1995 Lee ...................... 700/104
5,555,417 A * 9/1996 Odnert et al. ............ 717/159
5,765,012 A * 6/1998 Wilkinson et al. ........ 712/16
5,867,699 A * 2/1999 Kuslak et al. ............ 712/240
6,167,490 A * 12/2000 Levy et al. .............. 711/148
6,279,007 B1 * 8/2001 Uppala .................... 707/101
6,421,668 B1 * 7/2002 Yakhini et al. ............ 707/6
6,745,384 B1 * 6/2004 Biggerstaff ............. 717/156
6,954,842 B1 * 10/2005 Drabenstott et al. ..... 712/18

OTHER PUBLICATIONS

Title: Cellular Disco: resource management using virtual clusters on shared-memory multiprocessor, author: Govil et al, ACM, 1999.*
Title: Space-Time Scheduling of Instruction-Level Parallelism on Raw Machine, author: Lee et al, ACM, 1999.*
Gayathri Krishnamurthy et. al., *Affinity-Based Cluster Assignments for Unrolled Loops*, Texas Instruments Incorporated, ICS'02, Jun. 22-26, 2002, New York, New York USA pp. 1-11.

(Continued)

Primary Examiner—Chameli C. Das
(74) Attorney, Agent, or Firm—Robert D. Marshall, Jr.; W. James Brady; Frederick J. Telecky, Jr.

(57) ABSTRACT

The present invention provides methods specifically geared to finding natural splits in wide, nearly symmetric dependence graphs and assigning the components of the split to clusters in a VLIW processor. The basic approach of these methods is to assign a node n of the dependence graph to the cluster to which it has the strongest affinity. A node n has the strongest affinity to the cluster containing its closest common ancestor node. Then, the mirror image node or nodes of the node n are located if they are present in the graph and are assigned to other clusters in the processor to which they have the strongest affinity.

16 Claims, 10 Drawing Sheets

| 1 | AssignClusters() |
|---|---|
| 2 | { |
| 3 | Calculate l_cycle and e_cycle for each node |
| 4 | cyc = max $_{n \in N}$ (l_cycle) |
| 5 | W = ∅ |
| 6 | While (cyc ≥ min $_{n \in N}$ (e_cycle)) |
| 7 | { |
| 8 | W = W ∪ { n ∈ N | l_cycle(n) = cyc } |
| 9 | Wcand = { n ∈ W | e_cycle(n) = cyc } |
| 10 | While (Wcand !=∅) |
| 11 | { |
| 12 | Select preferred node from Wcand |
| 13 | Partition preferred node |
| 14 | Find mirror image node from Wcand or W if any |
| 15 | Partition mirror-mage node to opposite side |
| 16 | Remove assigned nodes from W and Wcand |
| 17 | } |
| 18 | cyc = cyc - 1 |
| 19 | } |
| 20 | Partition free nodes |
| 21 | } |

OTHER PUBLICATIONS

Jesus Sanchez et al., *The Effectiveness of Loop Unrolling for Modulo Scheduling in Clustered VLIW Architectures*, Department of Computer Architecture UPC, Barcelona, 8 pages.

Erik Nystrom et.al., *Effective Cluster Assignment for Modulo Scheduling*, ECE Department, NC State University, 12 pages.

Guiseppe Desoli, *Instruction assignment for clustered VLIW DSP compliers a new approach*, Hewlett Packard Company, HPL-98-13, Jan. 1998, pp. 1-18.

Alex Aleta et.al, *Graph-Partitioning Based Instruction Scheduling For Cluster Processers*, UPC, 34th Int. Symp. On Microarchitecture (MICRO-34), Austin, TX-Dec. 1-5, 2002, 21 pages.

Emre Ozer et.al, *Unified Assign And Schedule: A New Approach To Scheduling For Clustered Register File Microarchitectures*, NC State University and Hewlett Packard labs, 8 pages.

Josep M.Condina et.al., *A unified Mudulo Scheduling and Register Allocation Technique for clustered Processors*, Department of Computer Architecture, Universitat Politecnica de Catalunya, Barcelona, Spain, 10 pages.

Jason Hiser et,al., *Register Assignement for Software Pipelining with Partitioned Register Banks*, Univ. of VA, MI Tech. Univ., Metropolitan State College of Denver, CO, and Texas Instruments Incorporated, 7 pages.

* cited by examiner

*FIG. 2*

| 1 | AssignClusters() |
|---|---|
| 2 | { |
| 3 | Calculate l_cycle and e_cycle for each node |
| 4 | cyc = max $_{n \in N}$ (l_cycle) |
| 5 | W = ∅ |
| 6 | While (cyc ≥ min $_{n \in N}$ (e_cycle)) |
| 7 | { |
| 8 | W = W ∪ { n ∈ N \| l_cycle(n) = cyc } |
| 9 | Wcand = { n ∈ W \| e_cycle(n) = cyc } |
| 10 | While (Wcand !=∅) |
| 11 | { |
| 12 | Select preferred node from Wcand |
| 13 | Partition preferred node |
| 14 | Find mirror image node from Wcand or W if any |
| 15 | Partition mirror-mage node to opposite side |
| 16 | Remove assigned nodes from W and Wcand |
| 17 | } |
| 18 | cyc = cyc - 1 |
| 19 | } |
| 20 | Partition free nodes |
| 21 | } |

PARTITIONING SYMMETRIC NODES EFFICIENTLY IN A SPLIT REGISTER FILE ARCHITECTURE

This application claims priority under 35 USC §119(e)(1) of Provisional Application No. 60/341,557, filed Dec. 12, 2001.

FIELD OF THE INVENTION

This invention generally relates to microprocessors, and more specifically to improvements in compiler optimizations for partitioning instructions efficiently in a split register file architecture.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

VLIW processors, capable of executing multiple instructions per cycle, are designed to exploit instruction-level parallelism (ILP). In order to take advantage of existing ILP, these processors have both a large number of registers and a large number of functional units. Clock cycle constraints make it impossible to have a unified architecture with full connectivity between the register file and all functional units. Hence, these architectures usually have split register files where the register file is split into two or more register files, each of which is connected to a set of functional units. These register files in conjunction with their functional units are generally referred to as "clusters".

Compilers for processors with VLIW architectures generally use software pipelining to obtain good performance from loops. These architectures are typically used for image processing, and other mathematically intensive DSP applications. On average, approximately 90% of the execution time of these applications is spent executing loops. Hence, a lot of optimization effort is aimed at improving loop performance.

On a typical multi-cluster system, instructions are usually explicitly assigned to clusters by a compiler implementing one or more cluster assignment algorithms. The goal of these cluster assignment algorithms is to assign instructions to clusters such that ILP is maximized and cross-cluster communication is minimized. There are various existing cluster assignment algorithms, the classical one being the Bottom-Up Greedy algorithm (BUG). These algorithms typically run either before or in parallel with scheduling and register allocation.

Cluster assignment algorithms generally operate on a data dependence graph (DDG) which represents the flow of data between instructions in the body of a loop. Each node of the graph represents one instruction. Each directed edge represents the flow of data from one instruction to the next. The source node defines the data used at the sink node. Data can be either register values or memory values. The graph can contain both forward and backward edges. Forward edges represent intra-iteration dependencies. Backward edges represent inter-iteration dependencies, where values that are defined during one iteration are then used during a subsequent iteration.

The edges represent dependence partitioning constraints. If the source of a register edge is assigned to a cluster different than the sink of that edge, then data must be moved between clusters. The edges also represent scheduling constraints. The source node must be scheduled a certain number of cycles before the sink node, known as the minimum latency requirement.

Each node in a DDG has an associated $e_{13}$ cycle, l_cycle and slack range. These are computed as follows. Ignoring back-edges and assuming infinite resources, the earliest cycle on which a node may be scheduled is known as its e_cycle. The latest cycle on which a node may be scheduled and still generate the shortest possible schedule is known as the l_cycle. The slack range for a node is defined as l_cycle-e_cycle.

Prior art cluster assignment algorithms generally work quite well but there are sometimes performance inefficiencies when they are applied to unrolled loops. Loops are usually unrolled so that the unroll factor (number of copies of the loop body) is a multiple of the number of clusters. In essence, there should be a natural mapping of instructions to clusters. However, in some cases, the resulting cluster assignment using these prior art algorithms does not adhere to this natural mapping and an unnecessarily high amount of cross-cluster communication results.

Cluster assignment is usually performed before scheduling and register allocation. The goal of cluster assignment for unrolled loops is to generate a partition with maximum flexibility and minimum resource requirements, so that a minimum of extra constraints are imposed on the scheduler and register allocator. This is generally achieved when:

Functional unit usage is balanced
Opportunities for parallelism are maximized
Cross-cluster transfers are minimized
Registers copies are minimized
New instructions (e.g., cross-cluster moves) are minimized Note that minimizing recurrence constraints did not appear on the list. The reason is that unrolled loops are typically not recurrence-bound. Thus, pushing out recurrence bounds is not a primary concern. Hence, general cluster assignment algorithms, which prioritize nodes involved in recurrences, are not tailored for unrolled loops.

It is not always possible to assign instructions evenly across all functional units. However, in the case of loops, which are unrolled by a multiple of the number of clusters, it may be possible to achieve a nearly even balance across functional units of a given class across clusters. Even when a functional unit class is not a limited resource, there is more scheduling flexibility and more balanced register usage when the load is balanced evenly across all functional units, not just the bottlenecked ones. This allows maximum flexibility to schedule around dependence constraints and other resources that are in short supply. The lack of consideration of functional unit classes is a serious limitation of some prior art cluster-assignment algorithms.

In a DDG, if there is no dependence between two nodes, the corresponding instructions may be executed in parallel. Traditional scheduling algorithms only exploit intra-iteration parallelism. Software pipelining, the preferred approach for scheduling loops on VLIW processors, exploits both intra- and inter-iteration parallelism. When dependence constraints permit, software pipelining schedulers exploit the ILP that is available across loop iterations.

Most cluster assignment algorithms put together quick-and-dirty straight-line schedules to determine which nodes are candidates for parallelization. If the instructions are in parallel in the trial schedule, the cluster assignment algorithm tries to assign them to different clusters. Otherwise, the algorithm assumes that there is no benefit to scheduling the instructions in parallel. This approach is very limiting. First, if the loop is going to be software-pipelined, the trial straight-line schedule may be very different from the final software-pipelined schedule. Second, the introduction of cross-cluster communication can shift the set of instructions that might best be scheduled in parallel.

It should be straight-forward to find parallelism in unrolled loops. In theory, if a cluster assignment algorithm can identify the loop body copy to which an instruction belongs, it can simply map loop body copies to different clusters. In practice, this entails marking instructions when loops are unrolled and maintaining these markings across intervening optimizations. Marking instructions from unrolled loops has two drawbacks. First and foremost, marking does not handle manually unrolled loops. Second, it entails significant bookkeeping since all intervening optimizations must maintain these markings.

Most cluster assignment algorithms balance resources locally "on-the-fly", based on the assignments to nearest neighbors in the data dependence graph. Using this approach, functional unit usage may be balanced but cross-cluster transfers may be unnecessarily high. BUG, for example, which balances resources locally using a depth-first approach, can yield a checkerboard pattern when partitioning graphs from unrolled loops.

SUMMARY OF THE INVENTION

The present invention provides methods specifically geared to finding natural splits in wide, nearly symmetric dependence graphs and assigning the components of the splits to clusters in a VLIW processor. The basic approach of these methods is to assign a node n of the dependence graph to the cluster to which it has the strongest affinity. A node n has the strongest affinity to the cluster containing the node with which it shares the closest common ancestor. Then, the mirror image node or nodes of the node n are located if they are present in the graph and are assigned to other clusters in the processor to which they have the strongest affinity.

A method for finding the natural split in a wide, nearly symmetric graph is presented for a VLIW processor having two clusters. In this method, the earliest cycle and latest cycle of each node in the graph is calculated. Then, for each cycle from the maximum latest cycle value to the minimum earliest cycle value, a set of connected nodes W whose slack range encompasses the current cycle is selected for assignment. From this set of connected nodes, a subset of candidate nodes Wcand is selected such that each candidate node has an earliest cycle equal to the current cycle. These are the nodes that must be assigned to a cluster at this cycle. While Wcand is not empty, the following steps are performed: a preferred node having the strongest affinity to one of the two clusters is selected and assigned to the cluster to which it has the strongest affinity; a mirror image node, if one is present, is selected from either W or Wcand and assigned to the other cluster; and both assigned nodes are removed from W and Wcand. When Wcand is empty, the cycle is decremented and a new set of connected nodes W is selected for assignment.

A second method for finding natural splits in a wide, nearly symmetric graph is presented for a VLIW processor having more than two clusters. This method is similar to the one described above for a two cluster processor. The essential difference is that after a preferred node is found in Wcand and assigned a cluster, multiple mirror image nodes, one for each of the other clusters, may be selected and assigned to the other clusters.

BRIEF DESCRIPTION OF THE DRAWINGS

Particular embodiments in accordance with the invention will now be described, by way of example only, and with reference to the accompanying drawings:

FIG. 2 presents pseudocode describing a method for finding the natural split in a wide, nearly symmetric dependence graph, and assigning the components of the split to clusters in a two cluster processor such as the one illustrated in FIG. 1;

Corresponding numerals and symbols in the different figures and tables refer to corresponding parts unless otherwise indicated.

DETAILED DESCRIPTION OF EMBODIMENTS OF THE INVENTION

Figure 1:
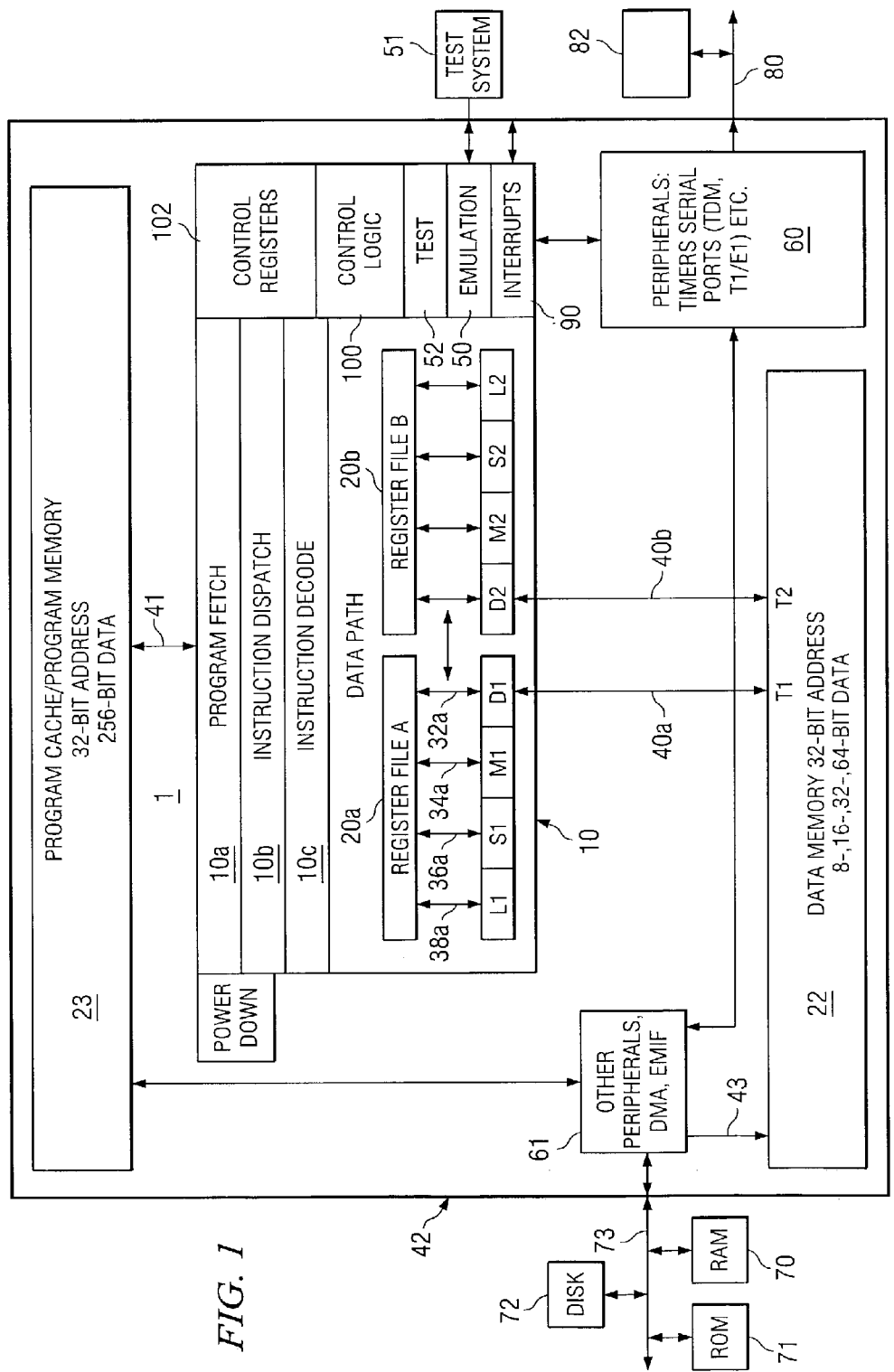
FIG. 1 is a block diagram of a digital system that executes software programs produced by an embodiment of the present invention.

FIG. 1 is a block diagram of a digital system that executes software programs produced by an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of microprocessor 1 relevant to an embodiment of the present invention are explained in sufficient detail herein below, so as to enable one of ordinary skill in the art of optimization of compiled code to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines that are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller is generally used to move data between memory and peripherals within microprocessor 1 and memory and peripherals that are external to microprocessor 1.

In the present embodiment, CPU core 10 is encapsulated as a MegaModule; however, other embodiments of the present invention may be in custom designed CPU's or mass market microprocessors, for example. A detailed description of various architectural features of the microprocessor of FIG. 1 is provided in U.S. Pat. No. 6,182,203 entitled Microprocessor. A description of enhanced architectural features and an extended instruction set not described herein for CPU 10 is provided in U.S. patent application Ser. No. 09/703,096 (TI-30302) entitled Microprocessor with Improved Instruction Set Architecture.

Compilers for VLIW architectures such as that illustrated in FIG. 1 generally use software pipelining to obtain good performance from loops. There are usually three steps involved in the process of software pipelining loops: partitioning or assigning operations to clusters, scheduling instructions to achieve good ILP, and allocating registers for instruction operands. Loop unrolling is generally used to permit better utilization of all available functional units. This technique usually creates loop dependence graphs that are symmetric or nearly symmetric. Often, the best way to partition such graphs is to find the natural split and map symmetric portions to different clusters. This will minimize inter-cluster transfers and the loop can be scheduled more easily with possibly a fewer cycles per loop iteration.

FIG. 2 presents pseudocode describing a method for finding the natural split in a wide, nearly symmetric dependence graph, and assigning the components of the split to clusters in a two cluster processor such as the one illustrated in FIG. 1. In this pseudocode, N is the set of nodes in the dependence graph that are connected by data edges. Free nodes, i.e., those nodes in the graph that are not connected by data edges, are assigned to clusters after the connected nodes are assigned.

First, as line 3 illustrates, the earliest execution cycle (e_cycle) and the latest execution cycle (l_cycle) are calculated for each graph node following data edges only. During the partitioning process, the graph is examined from the bottom up, beginning with those nodes with the highest l_cycle values. To. facilitate this examination, a cycle counter, cyc, is maintained. At line 4, the cycle counter is set to the maximum value of l_cycle in the graph. As is shown by line 6, the partitioning process ends when the cycle counter reaches the minimum value of e_cycle in the graph.

For each value of the cycle counter, a window of nodes W is examined. This window contains all nodes whose slack range encompasses the value of the cycle counter. In other words, the window contains all nodes that satisfy the property: e_cycle≦●cyc≦l⁻cycle. A node enters the window at its l_cycle and is partitioned at or before its e_cycle. This window of nodes W is selected at line 8.

A subset of nodes, Wcand, is extracted from the window of nodes W at line 9. Wcand consists of those nodes in W that have "reached" their e_cycle (that satisfy the property: e_cycle=cyc). Nodes within this subset have no slack time left and are partitioned first. At lines 12–13, the node with the strongest affinity to a cluster, the preferred node, is selected from Wcand and assigned to the cluster to which it has the strongest affinity.

Affinity for a given cluster is based on the proximity or distance to nodes that have already been assigned to the cluster. That is, the affinity of a node n to a cluster c is the distance in the graph from node n to the nearest node assigned to cluster c. Smaller affinity values imply stronger affinity to cluster c. The distance between two nodes is the shortest path that passes through a common ancestor. There are many different ways to compute the affinity of a node, one of which is described below in reference to Table 1.

Once the preferred node is selected and assigned, the mirror image node of the preferred node, if one exists, is located within Wcand or W (lines 14–15). A mirror image node is a node representing an instruction that uses the same type of functional unit as the preferred node and having the strongest affinity to the other cluster. This mirror image node (if any) is assigned to the other cluster. At line 16, the preferred node and the mirror image node are removed from W and Wcand. This process is repeated until all the nodes in Wcand have been assigned to a cluster.

When all nodes in Wcand have been processed, the cycle counter is decremented (line 18) and new nodes are added to the window W at line 8. These new nodes are ones currently "at" their l_cycle, i.e. their l_cycle equals the cycle counter. The method continues until all connected nodes in N are partitioned. Finally, at line 20, the free nodes of the dependence graph are assigned to the clusters so that resource usage is balanced.

FIGS. 3A–3G present an example of the application of the method of FIG. 2 to a synthetic dependence graph. For purposes of this example, the two clusters are referred to as cluster A and cluster B. To simplify the explanation, this example assumes all forward edge latencies are one. However, this is not a requirement of the method. The e_cycle and l_cycle for each node is represented as a (e_cycle, l_cycle) pair to the left of the associated node. Note that the graph has two singletons, $ADD_8$ and $ADD_{18}$. Singletons are nodes without a natural mirror image partner.

Each figure represents the state of the partitioning activity at each value of the cycle counter. Nodes that have been partitioned are marked with left diagonal lines, indicating assignment to cluster A, or right diagonal lines, indicating assignment to cluster B. The dotted line pair in each figure delineates the nodes in the window W at each value of the cycle counter.

Figure 3A:
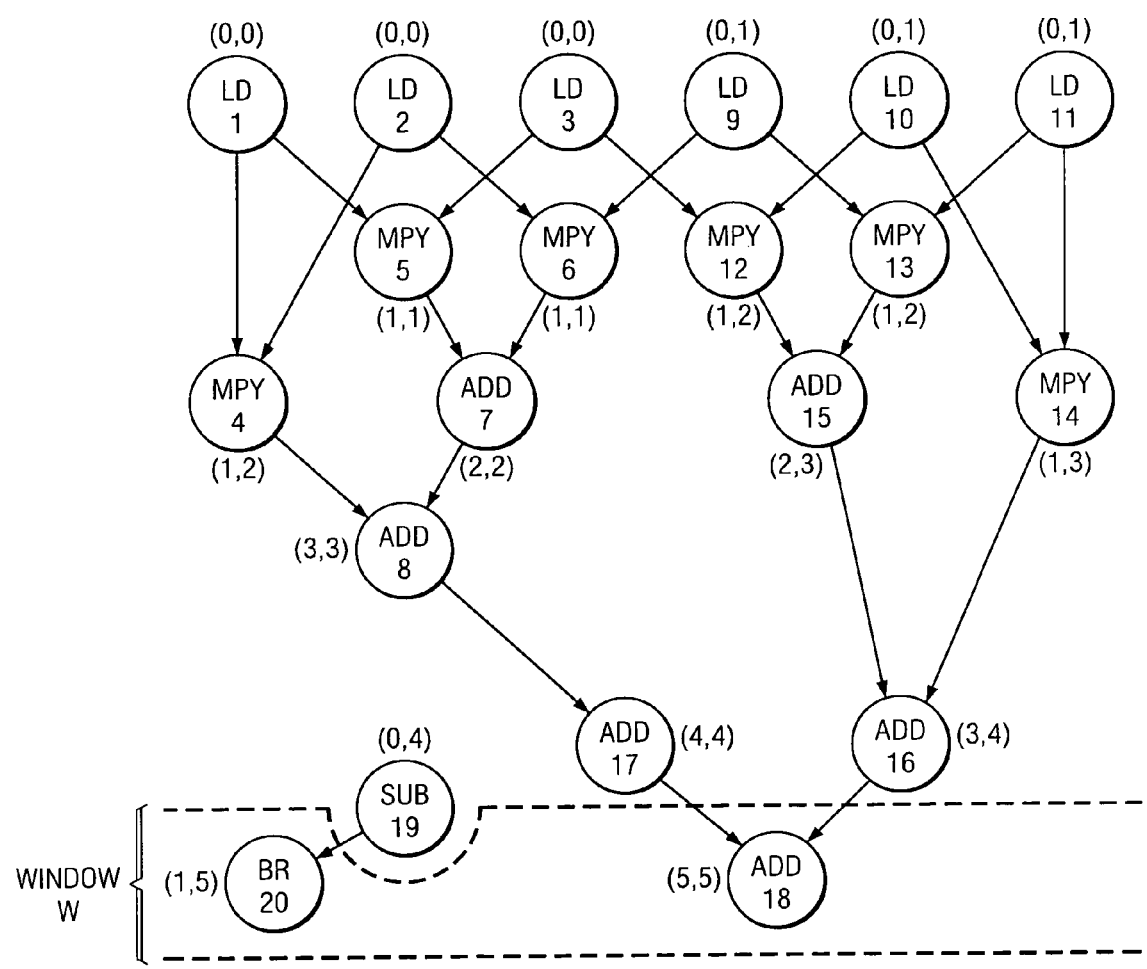
FIGS. 3A–3G present an example of the application of the method of FIG. 2 to a synthetic dependence graph.

At line 4 of FIG. 2, the cycle counter cyc is initialized to be 5, which is the maximum l_cycle of all the nodes in the graph. FIG. 3A represents the initial state of the graph prior to partitioning. At this point, cyc=5. Therefore, W={$ADD_{18}$, $BR_{20}$} as these are the only nodes with an l_cycle=5 (line 8 of FIG. 2) and Wcand={$ADD_{18}$} as this is the only node in W with an e_cycle=5 (line 9 of FIG. 2). At line 12 of FIG. 2, $ADD_{18}$, the only node in Wcand, is selected as the preferred node. $ADD_{18}$ has no affinity to either side and is arbitrarily assigned to cluster A. There are no other nodes within the window that have the same functional unit class and hence $ADD_{18}$ has no possible mirror image (lines 14–15 of FIG. 2). $ADD_{18}$ is removed from W and Wcand (line 16). W now contains only the node $BR_{20}$ and Wcand is empty. Since Wcand is now empty (see line 10), the cycle counter is decremented (line 18) and a new partitioning iteration is started.

Figure 3B:
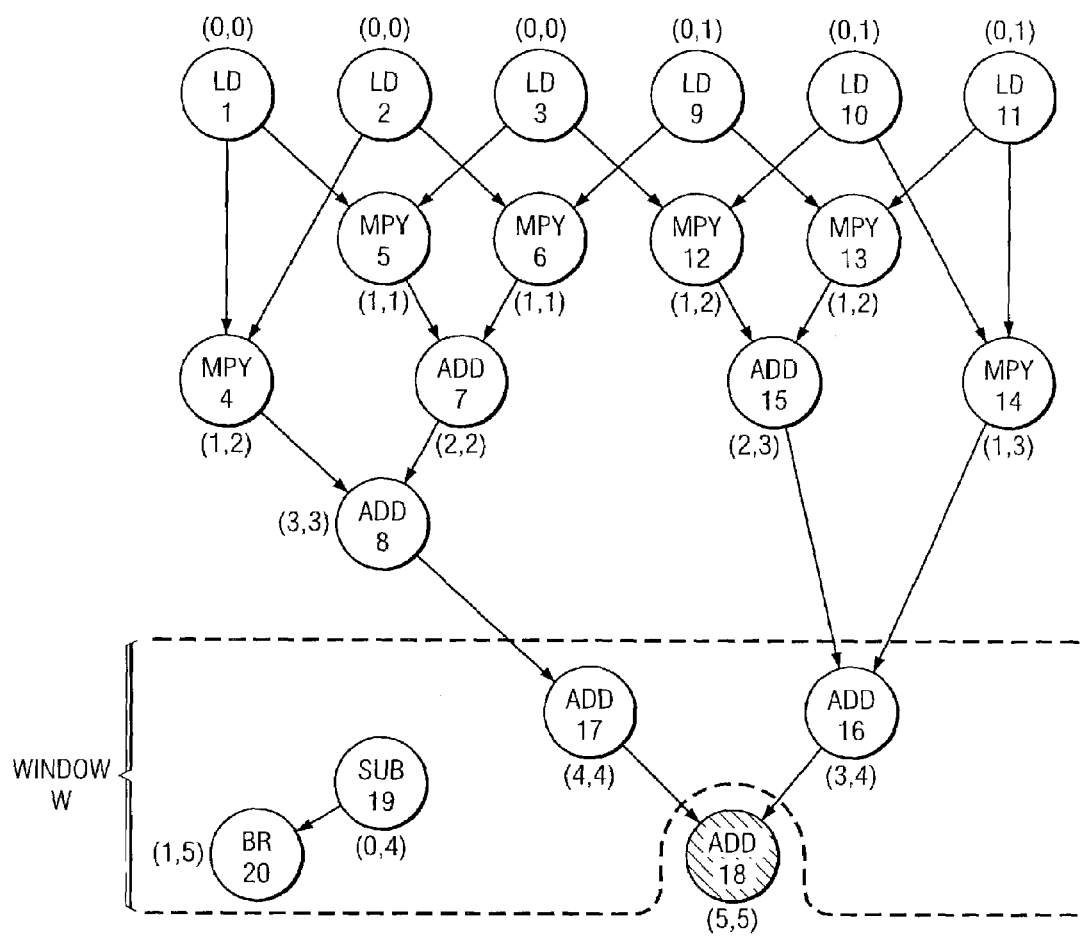

FIG. 3B represents the state of the partitioning activity at the beginning of the next partitioning iteration. Note that $ADD_{18}$ is now marked to indicate its assignment to cluster A. At this point, cyc=4 so the nodes $SUB_{19}$, $ADD_{17}$, and $ADD_{16}$ are added to W at line 8 yielding W={$BR_{20}$, $SUB_{19}$, $ADD_{17}$, $ADD_{16}$}. At line 9, Wcand={$ADD_{17}$} as this is the only node in W whose e_cycle is 4. At line 12, $ADD_{17}$ is selected as the preferred node. This node has the strongest affinity to cluster A, so at line 13, it is assigned to cluster A. At line 14, nodes $ADD_{16}$ and $SUB_{19}$ are identified as the possible choices for mirror image nodes to $ADD_{17}$ as both nodes represent instructions that may be assigned to the same functional unit class as $ADD_{17}$. If possible, the node with the strongest affinity to cluster B would be selected. Neither of these nodes has an affinity to cluster B, so the node with the least affinity to cluster A, $SUB_{19}$, is selected as the mirror image node and assigned to cluster B (line 15). Both assigned nodes are removed from W and Wcand at line 16, leaving Wcand empty and W={$BR_{20}$, $ADD_{16}$}. Since Wcand is now empty, the cycle counter is decremented (line 18) and a new partitioning iteration is started.

Figure 3C:
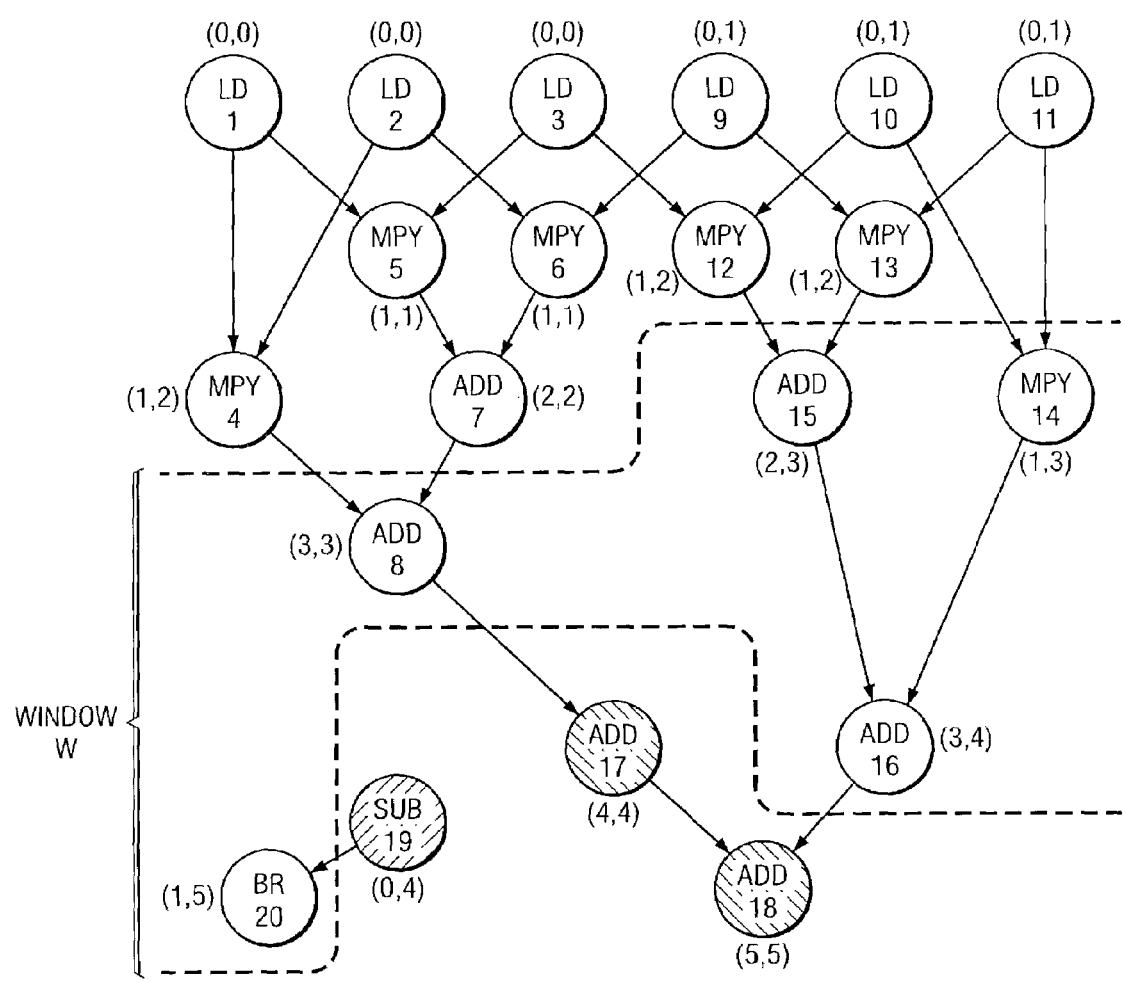

FIG. 3C represents the state of the partitioning activity at the beginning of the next partitioning iteration. Note that $ADD_{17}$ and $SUB_{19}$ are now marked to indicate their respective assignments to cluster A and cluster B. At this point, cyc=3 so the nodes $ADD_{15}$, $ADD_8$, and $MPY_{14}$ are added to W at line 8 yielding W={$BR_{20}$, $ADD_{16}$, $ADD_{15}$, $ADD_8$, $MPY_{14}$}. At line 9, Wcand={$ADD_8$, $ADD_{16}$} as these are the nodes in W whose e_cycle is 3. At line 12, $ADD_8$ is selected from Wcand as the preferred node. Generally, when there is more than one node in Wcand, the node with the strongest affinity to a cluster is selected as the preferred node. Here, both nodes have the same affinity to cluster A, so the node with the least slack range, $ADD_8$, is chosen. At line 14, two possible mirror image nodes are identified, $ADD_{16}$ and $ADD_{15}$ based on requiring the same functional unit class as the preferred node. Neither of these nodes has an affinity to cluster B, so the node with the least affinity to cluster A, $ADD_{15}$, is selected as the mirror image node and is assigned to cluster B (line 15). Both assigned nodes are removed from W and Wcand, leaving W={$BR_{20}$, $ADD_{16}$, $MPY_{14}$} and Wcand={$ADD_{16}$}. Since Wcand is not empty (line 10), the partitioning iteration continues. $ADD_{16}$ is selected as the preferred node. This node has equal affinity to both clusters so its cluster assignment will be based on the criteria of balancing resource usage. Since there are three nodes in its functional unit class assigned to cluster A and only two of the same functional unit class assigned to cluster B, $ADD_{16}$ is assigned to cluster B. This preferred node has no mirror image node in W. $ADD_{16}$ is removed from W and Wcand, leaving Wcand empty and W={$BR_{20}$, $MPY_{14}$}. Since Wcand is now empty, the cycle counter is decremented (line 18) and a new partitioning iteration is started.

Figure 3D:
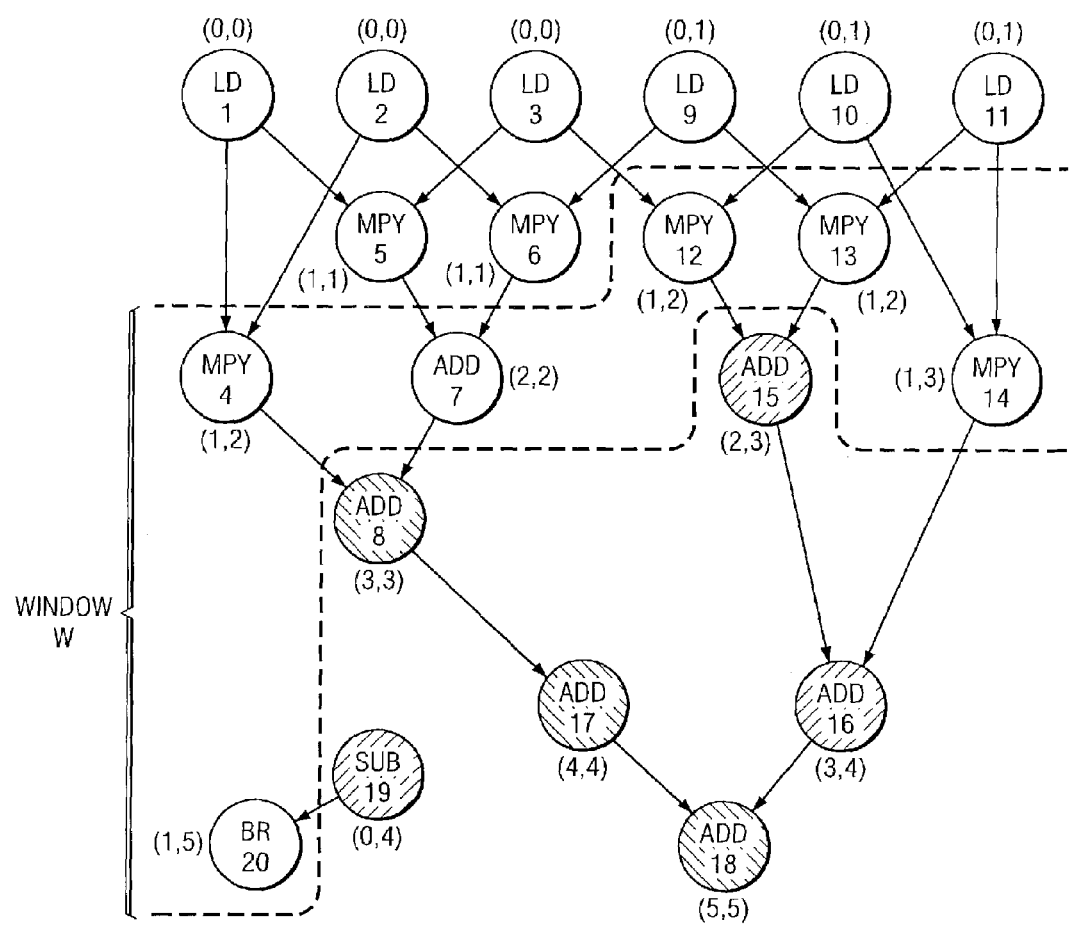

FIG. 3D represents the state of the partitioning activity at the beginning of the next partitioning iteration. At this point, cyc=2 so the nodes $ADD_7$, $MPY_4$, $MPY_{12}$, and $MPY_{13}$ are added to W at line 8 yielding W={$BR_{20}$, $ADD_7$, $MPY_4$, $MPY_{12}$, $MPY_{13}$, $MPY_{14}$}. At line 9, Wcand={$ADD_7$} as this is the only node in W whose e_cycle is 2. At line 12, $ADD_7$ is selected from Wcand as the preferred node. $ADD_7$ has the strongest affinity to cluster A, so it is assigned that cluster at line 13. This preferred node has no mirror image node in W as none of the nodes in W require the same functional unit class. $ADD_7$ is removed from W and Wcand, leaving Wcand empty and W={$BR_{20}$, $MPY_4$, $MPY_{12}$, $MPY_{13}$, $MPY_{14}$}. Since Wcand is now empty, the cycle counter is decremented (line 18) and a new partitioning iteration is started.

Figure 3E:
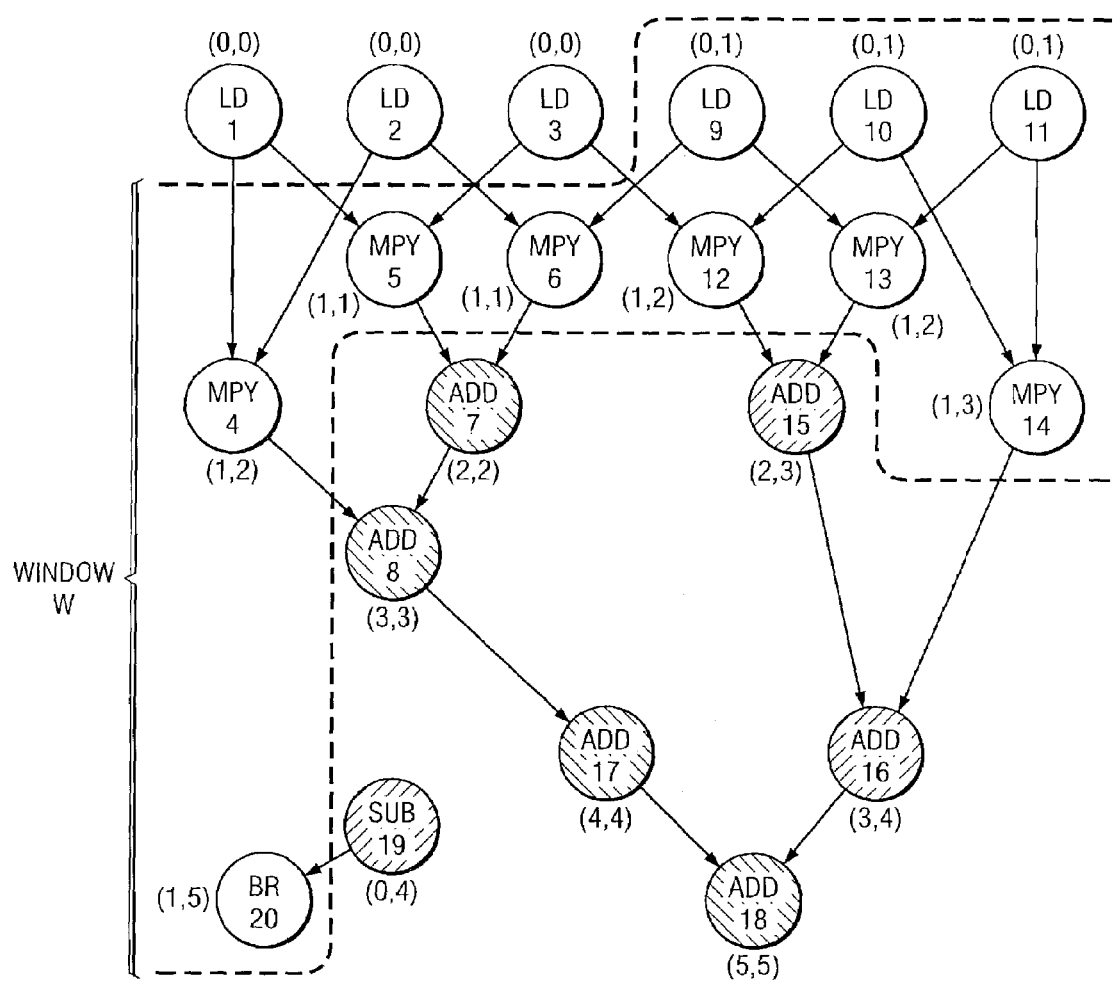

FIG. 3E represents the state of the partitioning activity at the beginning of the next partitioning iteration. At this point, cyc=1 so the nodes $MPY_5$, $MPY_6$, $LD_9$, $LD_{10}$, and $LD_{11}$ are added to W at line 8 yielding W={$BR_{20}$, $MPY_4$, $MPY_{12}$, $MPY_{13}$, $MPY_{14}$, $MPY_5$, $MPY_6$, $LD_9$, $LD_{10}$, $LD_{11}$}. At line 9, Wcand={$BR_{20}$, $MPY_4$, $MPY_{12}$, $MPY_{13}$, $MPY_{14}$, $MPY_5$, $MPY_6$} as these nodes have an e_cycle of 1. At line 12, $MPY_4$ is selected as the preferred node. Note that all of the nodes in Wcand have equal affinity to one of the two clusters, so slack range is used as a secondary criterion in selecting the preferred node. $MPY_5$ and $MPY_6$ each have a slack range of 0, so one of them will be chosen arbitrarily as the preferred node. For purposes of this example, assume that $MPY_5$ is selected. This node has the strongest affinity to cluster A, so it is assigned to that cluster at line 13. $MPY_{12}$, $MPY_{13}$, and $MPY_{14}$ are all equally good choices for the mirror image node based on having the same functional unit requirement as $MPY_5$ and having equal affinity to cluster B. Here, another tie breaking mechanism is applied, the distance from each of the candidate mirror image nodes to the second closest node assigned to cluster B. Using this criterion, $MPY_{14}$ is eliminated, but $MPY_{12}$ and $MPY_{13}$ are still tied. So, one of them is selected arbitrarily as the mirror image node. For purposes of this example, assume that $MPY_{12}$ is selected and assigned to cluster B. Both assigned nodes are removed from W and Wcand, leaving W={$BR_{20}$, $MPY_4$, $MPY_{13}$, $MPY_{14}$, $MPY_6$, $LD_9$, $LD_{10}$, $LD_{11}$} and Wcand={$BR_{20}$, $MPY_4$, $MPY_{13}$, $MPY_{14}$, $MPY_6$}. Since Wcand is not empty (line 10), the partitioning iteration continues. In the next partitioning pass, $MPY_6$ is selected as the preferred node and assigned to cluster A, and $MPY_{13}$ is selected as the mirror image node to $MPY_6$ and assigned to cluster B. In the subsequent partitioning pass, $MPY_4$ is selected as the preferred node and assigned to cluster A, and $MPY_{14}$ is selected as the mirror image node to $MPY_4$ and assigned to cluster B. In the final partitioning pass, $BR_{20}$ is selected as the preferred node and assigned to cluster B as it has the strongest affinity to cluster B. $BR_{20}$ has no mirror image node. Since Wcand is now empty, the cycle counter is decremented and a new partitioning iteration is started.

Figure 3F:
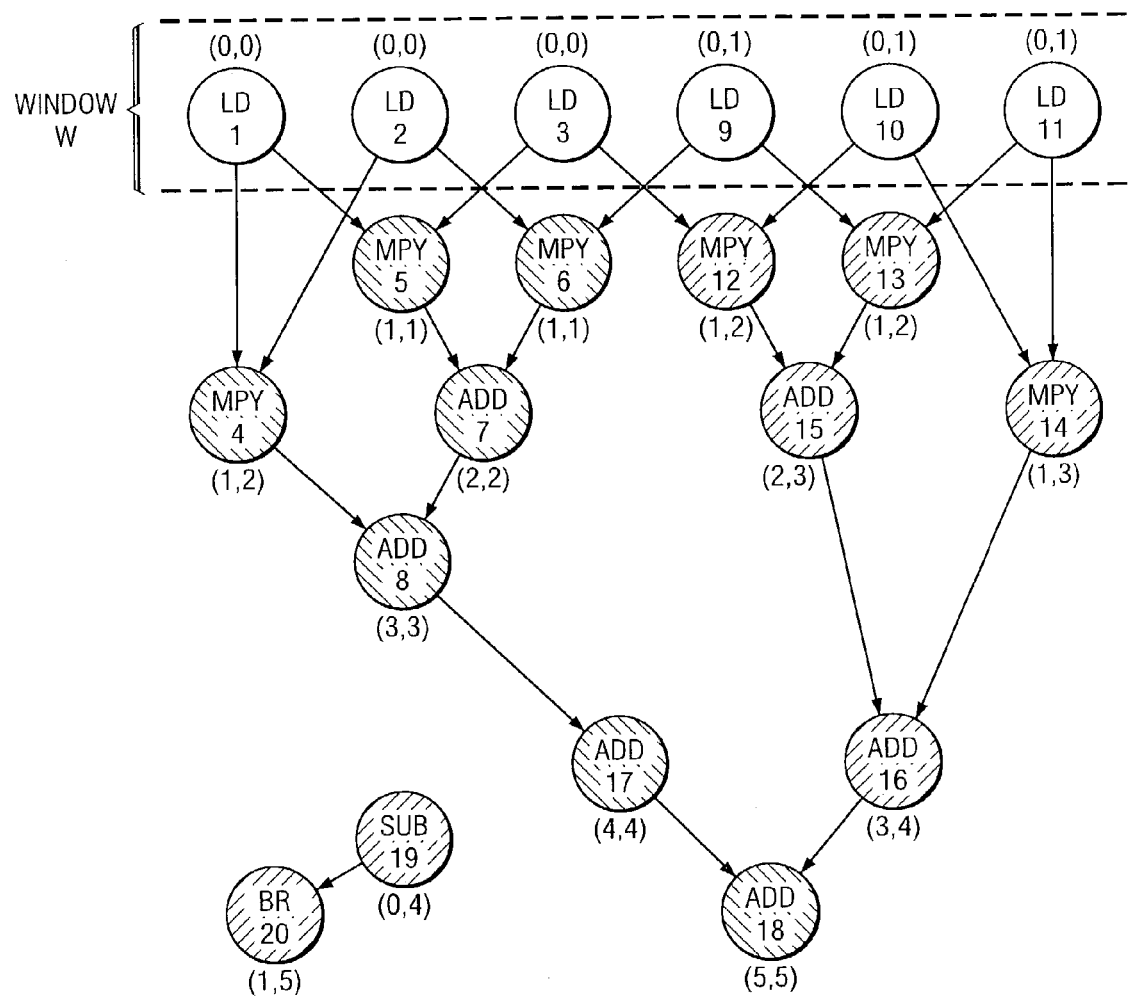
Figure 3G:
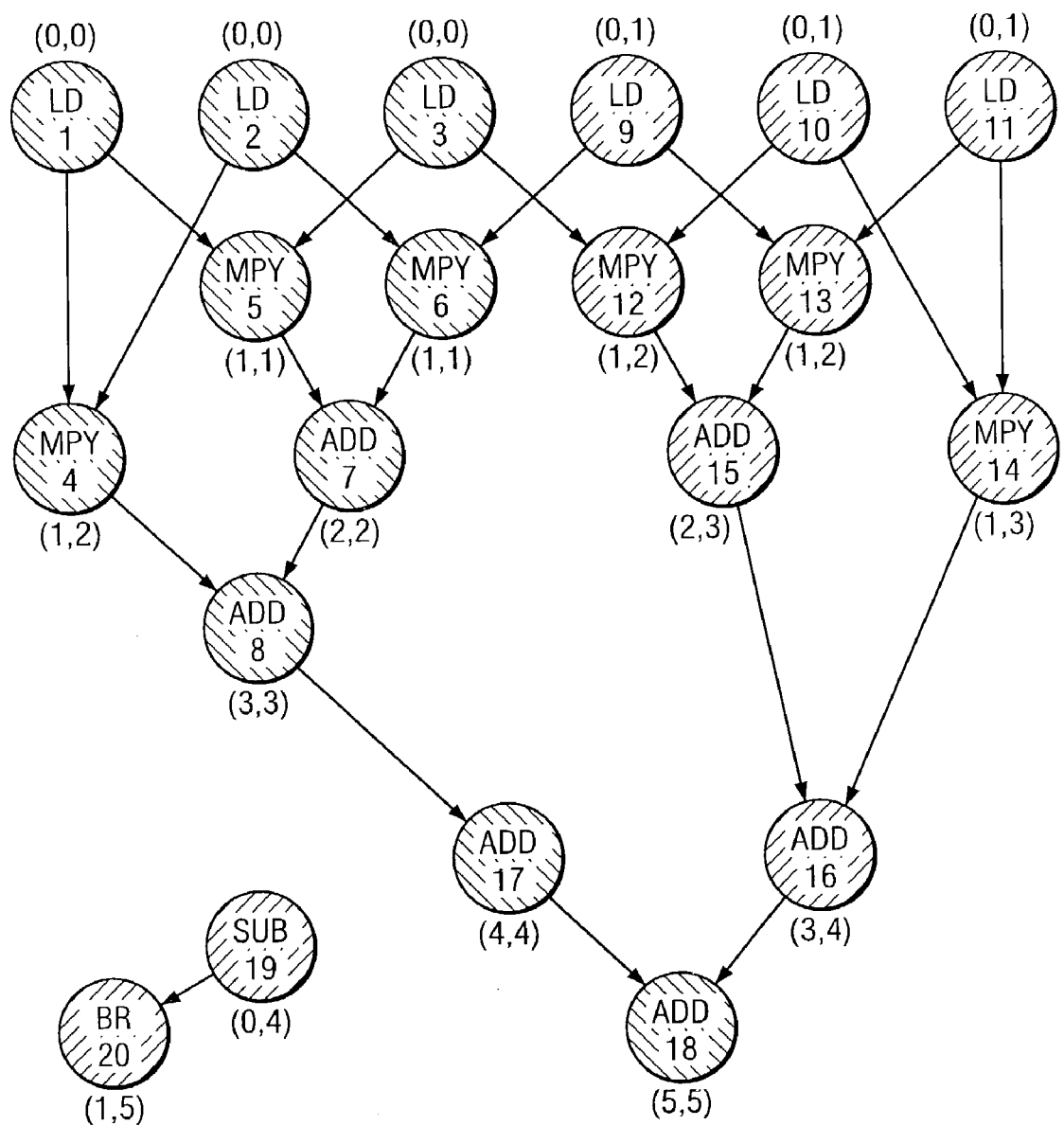

FIG. 3F represents the state of the partitioning activity at the beginning of the next partitioning iteration. At this point, cyc=0 so the nodes $LD_1$, $LD_2$, and $LD_3$ are added to W at line 8 yielding W={$LD_9$, $LD_{10}$, $LD_{11}$, $LD_1$, $LD_2$, $LD_3$}. At line 9, Wcand={$LD_9$, $LD_{10}$, $LD_{11}$, $LD_1$, $LD_2$, $LD_3$} as these nodes have an e_cycle of 0. During the partitioning process, $LD_1$ $LD_2$, and $LD_3$ are selected as preferred nodes in turn and assigned to cluster A and their respective mirror image nodes $LD_{10}$, $LD_{11}$, and $LD_9$ are assigned to cluster B. FIG. 3G illustrates the final cluster assignment.

Table 1 presents pseudocode describing an embodiment of the method of FIG. 2 that includes steps for determining the affinity of nodes. This embodiment also includes various tie-breaking mechanisms for selecting the preferred node and the mirror image node when no such node is found with a strongest affinity. This pseudocode is intended to be representative and does not include implementation details that are easily inferred by one skilled in the art.

In the method of Table 1, at line 6, the earliest execution cycle (e_cycle) and the latest execution cycle (l_cycle) are calculated for each graph node following data edges only. At lines 11–17, the free nodes are identified and set aside for partitioning after all the connected nodes are assigned to clusters.

At line 23, the closest common ancestor (CCA) distances are calculated for each node in the graph. The pseudocode describing the core of this calculation is at lines 186–212. In the distance computation, the dependence graph is treated as an undirected graph where all edges have unit weight. Two nodes without a common ancestor are assumed to be at distance infinity. Each node is considered to be an ancestor of itself. For example, in the dependence graph of FIG. 3, the distance between nodes $MPY_5$ and $MPY_4$ is 2 because the shortest. path through a common ancestor passes through $LD_1$ and has a length of 2. The distance between nodes $ADD_{17}$ and $ADD_{18}$ is 1. The common ancestor is node $ADD_{17}$.

The distance between nodes and their ancestors can be computed using any textbook algorithm for all-pairs shortest-path (line 199). Once these distances are known, the distances between each node pair can be computed (lines 200–212). This computation is best understood by way of an example. Given two nodes r and s, r is defined as an ancestor of s if there is either an edge from r to s, or there is an edge from r to an ancestor of s. If r is an ancestor of s, then r is itself the closest common ancestor between r and s, and the CCA distance for the node pair (r, s) is trivially the distance between r and s. If r and s don't share a common ancestor, their CCA distance is infinity. If r and s share a common ancestor x, then the distance to that ancestor is defined as the sum of the distances from r to that ancestor and from s to that ancestor, i.e., distance d to common ancestor x=distance (r, x)+distance (s, x). The distances of all common ancestors between r and s are computed, and the smallest value of d is the CCA distance between r and s.

During the partitioning process, the graph is examined from the bottom up, beginning with those nodes with the highest l_cycle values. To facilitate this examination, a cycle counter, cur_cycle, is maintained. This cycle counter starts at the maximum value of l_cycle in the graph and the partitioning process ends when the cycle counter reaches the minimum value of e_cycle in the graph (line 41).

For each value of the cycle counter, a window of nodes referred to as the active set is examined. This active set contains all nodes whose slack range encompasses the value of the cycle counter. In other words, the active set contains all nodes that satisfy the property: e_cycle≦cur_cycle≦l_cycle. A node enters the window at its l_cycle and is partitioned at or before its e_cycle. This active set, Active, is selected at line 47.

A subset of nodes, the Active_ae set, is extracted from Active at line 53. Active_ae consists of those nodes in Active that have "reached" their e_cycle (that satisfy the property: e_cycle=cur_cycle). Nodes within this subset have no slack time left and are partitioned first. At lines 59–62, the node with the strongest affinity to a cluster, the preferred node, here referred to as curr_node, is selected from Active_ae and assigned to the cluster to which it has the strongest affinity. Lines 99–137 and 245–283 present pseudocode for a method for selecting the node with strongest affinity to a cluster. In this pseudocode, the node in Active_ae with the shortest CCA distance to a cluster is deemed to have the strongest affinity. If there is more than one node in Active_ae with equivalent shortest CCA distances to either of the clusters, the next shortest CCA distance of these nodes to a cluster is used as tie-breaker. If there is still a tie after the next shortest CCA distance is checked, the node with the least slack time is selected. If there is still a tie after slack time is considered, the node with the least affinity to the opposite cluster is chosen. Finally, if there is still a tie after all of the above criteria have been applied, one of the tied nodes is selected arbitrarily.

If the selected node is equidistant from both clusters, an attempt is made to select the cluster to which it should be assigned by considering edge weights (145–178) if the node has edges to nodes assigned to both clusters. Edges involved in recurrences get highest weight, followed by edges on the critical path through the dependence graph, followed by the remaining edges. Although not considered in this embodiment, edges can be weighted by whether a cross path along this edge would incur an extra penalty. If there is still a tie after considering edge weights, the cluster for assignment is selected based on balancing resource usage.

Once the preferred node has been selected and assigned to a cluster, the preferred node is removed from Active and Active_ae (lines 60–61). Then, the CCA distances for all unassigned nodes are updated (lines 63 and 220–230) to reflect the fact that the preferred node has now been assigned to a cluster.

At lines 70–79, the mirror image or partner node of the preferred node, if one exists, is located within Active or Active_ae. First, all nodes in Active with the same functional unit class as the preferred node are located. The partner node will be selected from this set of potential partners. First preference is given to a node in this set with the strongest affinity to the cluster that the preferred node was not assigned to, i.e. the opposite cluster or side. If there is more than one node in the set of potential partner with a strongest affinity to the opposite cluster, then preference is given to a node with the strongest affinity that is also in Active_ae. The partner node, if one is found, is assigned to the opposite cluster and, at lines 80–81, the partner node is removed from Active and Active_ae. This process is repeated until all the nodes in Active_ae have been assigned to a cluster.

When all nodes in Active_ae have been processed, new nodes are added to Active at line 47. These new nodes are ones currently "at" their l_cycle, i.e. their l_cycle equals the cycle counter, cur_cycle. The method continues until all connected nodes are partitioned. Finally, at line 86, the free nodes of the dependence graph are assigned to the clusters so that resource usage is balanced.

Figure 4:
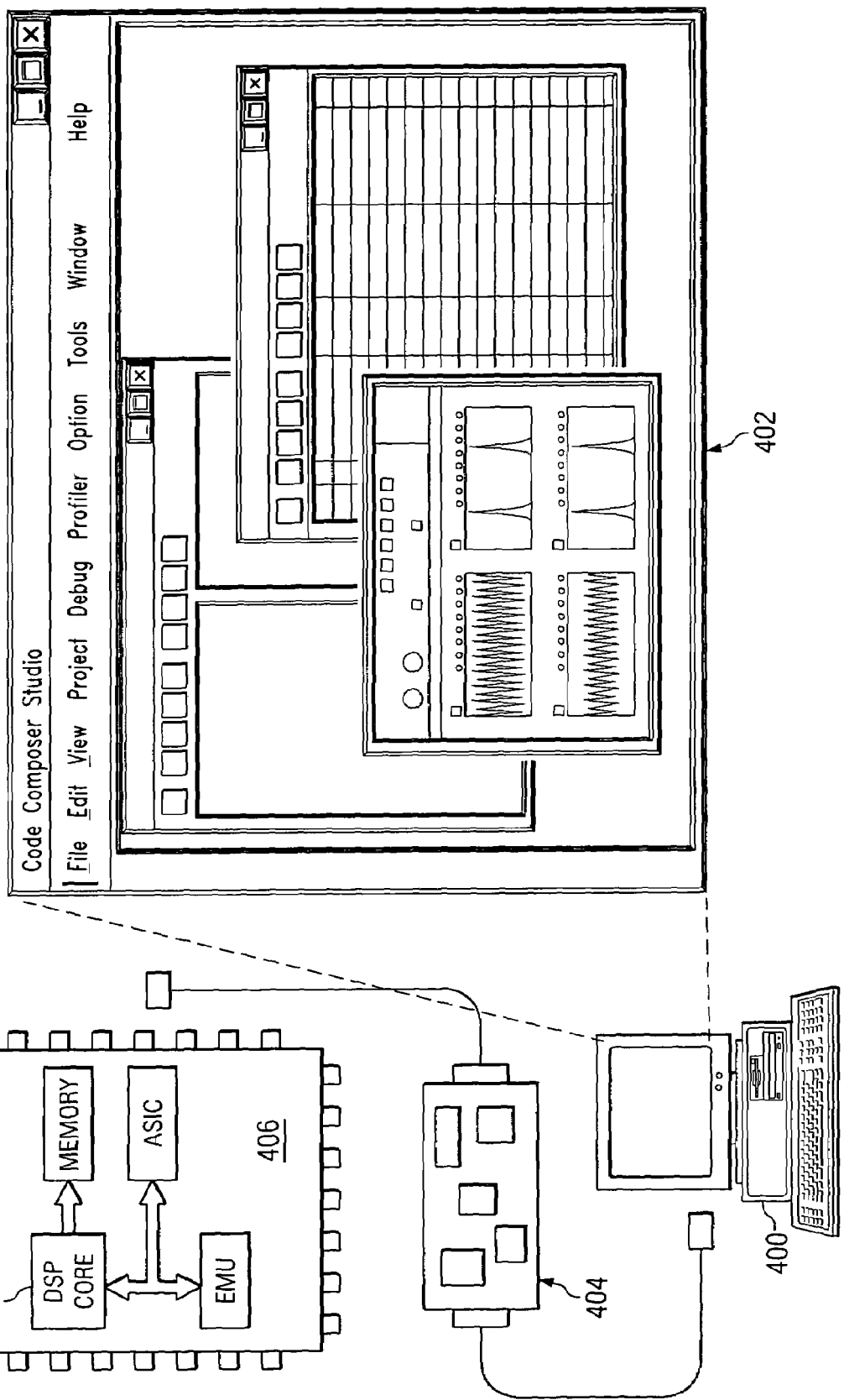
FIG. 4 illustrates the elements of a development system that incorporates the method of FIG. 2 and generates object code using this method for a VLIW processor such as that of FIG. 1.

FIG. 4 illustrates the elements of a development system including a compiler that incorporates the method of FIG. 2 and generates object code using this method for a VLIW processor such as that of FIG. 1. General purpose computer 400 is connected to target hardware 406 with emulation controller 404. Target hardware 406 is a digital system that includes VLIW processor 408. General purpose computer 400 hosts a software development system with user interface 402. This software development system includes in its functionality a compiler that generates optimized code to be executed on VLIW processor 408. This compiler utilizes the optimization methods described herein to cause instructions to be optimally assigned to clusters when the resulting compiled code is executed on VLIW processor 408.

The methods of the present invention have been presented above in reference to a VLIW processor with two clusters. However, these methods are easily adaptable to VLIW processors with more than two clusters. Given an n-cluster processor, the loop unroll factors would be multiples of n so that the resulting dependence graph has n-way symmetry. Then, when a preferred node is selected and assigned to a cluster, mirror image nodes for the preferred node are found for the n−1 other clusters.

The methods presented herein have several advantages over those in the prior art. For example, a natural split in a dependence graph will be found even if the graph is not perfectly symmetric. And, no trial schedule is produced. Instead the methods operate on the dependence graph itself. The potential for scheduling operations in parallel is based on the overlap between the slack ranges of nodes. This results in a better partition with more scheduling flexibility. These methods seek to minimize cross-cluster transfers without explicitly tracking them, which reduces implementation overhead. Finally, unlike many prior art methods for cluster assignment, these methods work equally well on compiler unrolled loops and manually unrolled loops.

While the invention has been described with reference to illustrative embodiments, this description should not be construed in a limiting sense. Various other embodiments of the invention will be apparent to persons skilled in the art upon reference to this description. For example, the methods described herein may also be used to partition non-symmetric graphs, but the results may not be better than that from prior art cluster allocation algorithms. The methods are also not limited to loops—they can also partition straight-line code optimally, as long as the code has a symmetric or nearly-symmetric dependence graph. It is therefore contemplated that the appended claims will cover any such modifications of the embodiments as fall within the true scope and spirit of the invention.

What is claimed is:

1. A method for assigning instructions to two clusters comprising the steps of:
   generating a plurality of instructions;
   creating a data dependence graph comprised of a plurality of nodes wherein each node of the plurality of nodes represents an instruction from the plurality of instructions;
   calculating an earliest cycle and a latest cycle for each node of the plurality of nodes;
   performing the following steps a–c for each cycle between and inclusive of a maximum value of the latest cycle calculated for any connected node of the plurality of nodes and a minimum value of the earliest cycle calculated for any connected node of the plurality of nodes:
   a. selecting a window of connected nodes to be considered for assignment to a cluster wherein the cycle falls within a slack range of each selected node;
   b. selecting a set of candidate nodes from the window of nodes such that each node in the candidate set has an earliest cycle value equal to the value of the cycle; and
   c. performing the following steps while the set of candidate nodes is not empty:
      c1. selecting a preferred node from the set of candidate nodes such that the preferred node has a strongest affinity to a cluster of the two clusters of any node in the set of candidate nodes;
      c2. assigning the preferred node to the cluster of the two clusters to which the preferred node has a strongest affinity;
      c3. removing the preferred node from the set of candidate nodes;
      c4. selecting a mirror image node, if present, from the set of candidate nodes or from the window of nodes;
      c5. assigning the mirror image node to a cluster of the two clusters to which the preferred node is not assigned; and
      c6. removing the mirror image node from the set of candidate nodes or from the window of nodes.

2. The method of claim 1 further comprising the step of assigning each free node, if any, to either a first cluster or a second cluster of the two clusters.

3. The method of claim 2 in which the step of assigning each free node further comprises making the assignments such that resource usage is balanced.

4. The method of claim 1 in which
   the step c1 further comprises determining there is a plurality of nodes in the set of candidate nodes having the strongest affinity to a cluster of the two clusters and selecting the preferred node from the plurality of nodes such that the preferred node has the least amount of slack time of any node in the plurality of nodes; and
   the step c2 further comprises assigning the preferred node to a cluster of the two clusters such that resource usage is balanced if the preferred node has an equal affinity to each cluster of the two clusters.

5. The method of claim 1 wherein step c further comprises assigning the preferred node to a cluster of the two clusters such that resource usage is balanced if the preferred node has an equal affinity to each cluster of the two clusters.

6. The method of claim 1 in which the plurality of instructions is an unrolled loop.

7. A method for assigning instructions to a plurality of clusters comprising the steps of:
   generating a plurality of instructions;
   creating a data dependence graph comprised of a plurality of nodes wherein each node of the plurality of nodes represents an instruction from the plurality of instructions;
   calculating an earliest cycle and a latest cycle for each node of the plurality of nodes;
   performing the following steps a-c for each cycle between and inclusive of a maximum value of the latest cycle calculated for any connected node of the plurality of nodes and a minimum value of the earliest cycle calculated for any connected node of the plurality of nodes:

a. selecting a window of connected nodes to be considered for assignment to a cluster wherein the cycle falls within a slack range of each selected node;

b. selecting a set of candidate nodes from the window of nodes such that each node in the candidate set has an earliest cycle value equal to the value of the cycle; and c. performing the following steps while the set of candidate nodes is not empty:

c1. selecting a preferred node from the set of candidate nodes such that the preferred node has a strongest affinity to a cluster of the plurality of clusters of any node in the set of candidate nodes;

c2. assigning the preferred node to a cluster of the plurality of clusters to which the preferred node has a strongest affinity;

c3. removing the preferred node from the set of candidate nodes; and c4. performing the following steps for each additional cluster of the plurality of clusters:

c4.1 selecting a mirror image node, if present, from the set of candidate nodes or from the window of nodes;

c4.2 assigning the mirror image node to the additional cluster; and c4.3 removing the mirror image node from the set of candidate nodes or from the window of nodes.

8. The method of claim 7 further comprising the step of assigning each free node, if any, to a cluster of the plurality of clusters.

9. The method of claim 8 in which the step of assigning each free node further comprises making the assignments such that resource usage is balanced.

10. The method of claim 7 in which the step c1 further comprises determining there is a plurality of nodes in the set of candidate nodes having the strongest affinity to a cluster of the plurality of clusters and selecting the preferred node from the plurality of nodes such that the preferred node has the least amount of slack time of any node in the plurality of candidate nodes; and the step c2 further comprises determining that the preferred node has an equal affinity to two or more clusters of the plurality of clusters and assigning the preferred node to one of the clusters to which the preferred node has equal affinity such that resource usage is balanced.

11. The method of claim 7 wherein the step c further comprises the step of determining that the preferred node has an equal affinity to two or more clusters of the plurality of clusters and assigning the preferred node to one of the clusters to which the preferred node has equal affinity such that resource usage is balanced.

12. The method of claim 7 in which the plurality of instructions is an unrolled loop.

13. A development system comprising:

a general purpose computer; and a software development system installed on the general purpose computer wherein the software development system comprises a compiler incorporating a method for assigning instructions to two clusters comprising the steps of:

generating a plurality of instructions;

creating a data dependence graph comprised of a plurality of nodes wherein each node of the plurality of nodes represents an instruction from the plurality of instructions;

calculating an earliest cycle and a latest cycle for each node of the plurality of nodes;

performing the following steps a–c for each cycle between and inclusive of a maximum value of the latest cycle calculated for any connected node of the plurality of nodes and a minimum value of the earliest cycle calculated for any connected node of the plurality of nodes:

a. selecting a window of connected nodes to be considered for assignment to a cluster wherein the cycle falls within a slack range of each selected node;

b. selecting a set of candidate nodes from the window of nodes such that each node in the candidate set has an earliest cycle value equal to the value of the cycle; and c. performing the following steps while the set of candidate nodes is not empty:

c1. selecting a preferred node from the set of candidate nodes such that the preferred node has a strongest affinity to a cluster of the two clusters of any node in the set of candidate nodes;

c2. assigning the preferred node to the cluster of the two clusters to which the preferred node has a strongest affinity;

c3. removing the preferred node from the set of candidate nodes;

c4. selecting a mirror image node, if present, from the set of candidate nodes or from the window of nodes;

c5. assigning the mirror image node to a cluster of the two clusters to which the preferred node is not assigned; and c6. removing the mirror image node from the set of candidate nodes or from the window of nodes.

14. A development system comprising:

a general purpose computer; and a software development system installed on the general purpose computer wherein the software development system comprises a compiler incorporating a method for assigning instructions to a plurality of clusters comprising the steps of:

generating a plurality of instructions;

creating a data dependence graph comprised of a plurality of nodes wherein each node of the plurality of nodes represents an instruction from the plurality of instructions;

calculating an earliest cycle and a latest cycle for each node of the plurality of nodes;

performing the following steps a–c for each cycle between and inclusive of a maximum value of the latest cycle calculated for any connected node of the plurality of nodes and a minimum value of the earliest cycle calculated for any connected node of the plurality of nodes:

a. selecting a window of connected nodes to be considered for assignment to a cluster wherein the cycle falls within a slack range of each selected node;

b. selecting a set of candidate nodes from the window of nodes such that each node in the candidate set has an earliest cycle value equal to the value of the cycle; and c. performing the following steps while the set of candidate nodes is not empty:

c1. selecting a preferred node from the set of candidate nodes such that the preferred node has a strongest affinity to a cluster of the plurality of clusters of any node in the set of candidate nodes;

c2. assigning the preferred node to a cluster of the plurality of clusters to which the preferred node has a strongest affinity;

c3. removing the preferred node from the set of candidate nodes; and c4. performing the following steps for each additional cluster of the plurality of clusters:

c4.1 selecting a mirror image node, if present, from the set of candidate nodes or from the window of nodes;

c4.2 assigning the mirror image node to the additional cluster; and c4.3 removing the mirror image node from the set of candidate nodes or from the window of nodes.

15. A digital system comprising:

a processor comprising two clusters and operable to execute an application program; and wherein the application program was compiled with a compiler using a method for assigning instructions to two clusters comprising the steps of:

generating a plurality of instructions;

creating a data dependence graph comprised of a plurality of nodes wherein each node of the plurality of nodes represents an instruction from the plurality of instructions;

calculating an earliest cycle and a latest cycle for each node of the plurality of nodes;

performing the following steps a–c for each cycle between and inclusive of a maximum value of the latest cycle calculated for any connected node of the plurality of nodes and a minimum value of the earliest cycle calculated for any connected node of the plurality of nodes:

a. selecting a window of connected nodes to be considered for assignment to a cluster wherein the cycle falls within a slack range of each selected node;

b. selecting a set of candidate nodes from the window of nodes such that each node in the candidate set has an earliest cycle value equal to the value of the cycle; and c. performing the following steps while the set of candidate nodes is not empty:

c1. selecting a preferred node from the set of candidate nodes such that the preferred node has a strongest affinity to a cluster of the two clusters of any node in the set of candidate nodes;

c2. assigning the preferred node to the cluster of the two clusters to which the preferred node has a strongest affinity;

c3. removing the preferred node from the set of candidate nodes;

c4. selecting a mirror image node, if present, from the set of candidate nodes or from the window of nodes;

c5. assigning the mirror image node to a cluster of the two clusters to which the preferred node is not assigned; and c6. removing the mirror image node from the set of candidate nodes or from the window of nodes.

16. A digital system comprising:

a processor comprising a plurality of clusters and operable to execute an application program; and wherein the application program was compiled with a compiler using a method for assigning instructions to a plurality of clusters comprising the steps of:

generating a plurality of instructions;

creating a data dependence graph comprised of a plurality of nodes wherein each node of the plurality of nodes represents an instruction from the plurality of instructions;

calculating an earliest cycle and a latest cycle for each node of the plurality of nodes;

performing the following steps a–c for each cycle between and inclusive of a maximum value of the latest cycle calculated for any connected node of the plurality of nodes and a minimum value of the earliest cycle calculated for any connected node of the plurality of nodes:

a. selecting a window of connected nodes to be considered for assignment to a cluster wherein the cycle falls within a slack range of each selected node;

b. selecting a set of candidate nodes from the window of nodes such that each node in the candidate set has an earliest cycle value equal to the value of the cycle; and c. performing the following steps while the set of candidate nodes is not empty:

c1. selecting a preferred node from the set of candidate nodes such that the preferred node has a strongest affinity to a cluster of the plurality of clusters of any node in the set of candidate nodes;

c2. assigning the preferred node to a cluster of the plurality of clusters to which the preferred node has a strongest affinity;

c3. removing the preferred node from the set of candidate nodes; and c4. performing the following steps for each additional cluster of the plurality of clusters:

c4.1 selecting a mirror image node, if present, from the set of candidate nodes or from the window of nodes;

c4.2 assigning the mirror image node to the additional cluster; and c4.3 removing the mirror image node from the set of candidate nodes or from the window of nodes.

* * * * *